United States Patent
Mueller et al.

(10) Patent No.: US 11,341,607 B2
(45) Date of Patent: May 24, 2022

(54) ENHANCED RENDERING OF SURROUND VIEW IMAGES

(71) Applicant: TEXAS INSTRUMENTS INCORPORATED, Dallas, TX (US)

(72) Inventors: Martin Fritz Mueller, San Jose, CA (US); Shashank Dabral, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 154 days.

(21) Appl. No.: 16/434,952

(22) Filed: Jun. 7, 2019

(65) Prior Publication Data

US 2020/0388005 A1    Dec. 10, 2020

(51) Int. Cl.
*G06T 3/40* (2006.01)
*G06T 3/00* (2006.01)
*B60R 1/00* (2022.01)

(52) U.S. Cl.
CPC .............. *G06T 3/4038* (2013.01); *B60R 1/00* (2013.01); *G06T 3/0056* (2013.01); *B60R 2300/105* (2013.01); *B60R 2300/304* (2013.01); *B60R 2300/306* (2013.01)

(58) Field of Classification Search
CPC ....... G06T 3/4038; G06T 3/0056; B60R 1/00; B60R 2300/306; B60R 2300/105; B60R 2300/304
See application file for complete search history.

(56) References Cited

U.S. PATENT DOCUMENTS

| | | | |
|---|---|---|---|
| 10,397,524 B1 * | 8/2019 | Wu | G08B 13/19628 |
| 10,897,600 B1 * | 1/2021 | Dabral | G06T 7/174 |
| 2004/0061787 A1 * | 4/2004 | Liu | H04N 7/142 |
| | | | 348/218.1 |

(Continued)

FOREIGN PATENT DOCUMENTS

TW    201741759 A    12/2017

OTHER PUBLICATIONS

Vikram Appia et al., "Surround View Camera System for ADAS on TI's TDAx SoCs", Texas Instruments, pp. 1-18.

(Continued)

*Primary Examiner* — Aaron W Carter
(74) *Attorney, Agent, or Firm* — Ebby Abraham; Charles A. Brill; Frank D. Cimino

(57) ABSTRACT

An apparatus comprising a memory and one or more processing circuits is provided. The memory stores a blend table having blend weights. The processing circuits, for partitions of the blend table: determine whether a subset of the pixels associated with the partition includes pixels associated with seamlines defined in a three-dimensional surface representation of the scene. If none of the subset of the pixels are associated with the seamlines, the processing circuits populate a region of the virtual image corresponding to the partition with pixel values from an image captured by one of the plurality of image capture devices. If one or more of the subsets of the pixels is associated with the seamlines, the processing circuits populate the region of the virtual image associated with the partition with blended pixel values from two or more images captured by two or more of the plurality of image capture devices.

14 Claims, 11 Drawing Sheets

(56) References Cited

U.S. PATENT DOCUMENTS

| | | | |
|---|---|---|---|
| 2006/0109284 A1* | 5/2006 | Hsieh | G06T 15/503 345/639 |
| 2010/0194889 A1* | 8/2010 | Arndt | G06K 9/00201 348/148 |
| 2011/0069906 A1* | 3/2011 | Park | G06T 5/50 382/284 |
| 2013/0329002 A1 | 12/2013 | Tico | |
| 2015/0030242 A1* | 1/2015 | Shen | G06T 5/50 382/165 |
| 2015/0139568 A1 | 5/2015 | Liu et al. | |
| 2016/0142644 A1* | 5/2016 | Lin | H04N 5/23238 348/143 |
| 2017/0195564 A1 | 7/2017 | Appia et al. | |
| 2017/0236305 A1 | 8/2017 | Staudenmaier et al. | |
| 2018/0184078 A1 | 6/2018 | Shivalingappa et al. | |
| 2018/0191954 A1* | 7/2018 | Pan | H04N 13/246 |
| 2018/0336806 A1 | 11/2018 | Karthik et al. | |
| 2019/0096041 A1* | 3/2019 | Allu | G06T 5/006 |
| 2019/0096042 A1* | 3/2019 | Allu | G06T 5/006 |
| 2019/0096077 A1* | 3/2019 | Allu | G06T 7/11 |
| 2019/0191106 A1* | 6/2019 | Dabral | H04N 5/232 |
| 2019/0289205 A1* | 9/2019 | Lin | G06T 15/10 |
| 2019/0325580 A1* | 10/2019 | Lukac | G06T 7/12 |
| 2020/0098164 A1* | 3/2020 | Bruns | G06T 15/205 |
| 2020/0226816 A1* | 7/2020 | Kar | G06T 15/503 |
| 2020/0280678 A1* | 9/2020 | Hariyani | H04N 5/23238 |
| 2020/0388005 A1* | 12/2020 | Mueller | G06T 3/4038 |
| 2021/0027522 A1* | 1/2021 | Dabral | G06T 5/006 |
| 2021/0209426 A1* | 7/2021 | Jia | G06K 9/342 |

OTHER PUBLICATIONS

PCT International Search Report; PCT/US 2020/036570; dated Jul. 30, 2020.

* cited by examiner

322 BLEND TABLE FOR IMAGE CAPTURE DEVICE 1 (320)

| 1 | 1 | 1 | 1 | 1 | 1 | 3/4 | 1/2 |
|---|---|---|---|---|---|---|---|
| 1 | 1 | 1 | 1 | 1 | 3/4 | 1/2 | 1/4 |
| 1 | 1 | 1 | 1 | 3/4 | 1/2 | 1/4 | 0 |
| 1 | 1 | 1 | 3/4 | 1/2 | 1/4 | 0 | 0 |
| 1 | 1 | 3/4 | 1/2 | 1/4 | 0 | 0 | 0 |
| 1 | 3/4 | 1/2 | 1/4 | 0 | 0 | 0 | 0 |
| 3/4 | 1/2 | 1/4 | 0 | 0 | 0 | 0 | 0 |
| 1/2 | 1/4 | 0 | 0 | 0 | 0 | 0 | 0 |

332 BLEND TABLE FOR IMAGE CAPTURE DEVICE 2 (330)

| 0 | 0 | 0 | 0 | 0 | 0 | 1/4 | 1/2 |
|---|---|---|---|---|---|---|---|
| 0 | 0 | 0 | 0 | 0 | 1/4 | 1/2 | 3/4 |
| 0 | 0 | 0 | 0 | 1/4 | 1/2 | 3/4 | 1 |
| 0 | 0 | 0 | 1/4 | 1/2 | 3/4 | 1 | 1 |
| 0 | 0 | 1/4 | 1/2 | 3/4 | 1 | 1 | 1 |
| 0 | 1/4 | 1/2 | 3/4 | 1 | 1 | 1 | 1 |
| 1/4 | 1/2 | 3/4 | 1 | 1 | 1 | 1 | 1 |
| 1/2 | 3/4 | 1 | 1 | 1 | 1 | 1 | 1 |

342 BLEND TABLE FOR IMAGE CAPTURE DEVICE 3 (340)

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

352 BLEND TABLE FOR IMAGE CAPTURE DEVICE 4 (350)

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 3B

FIG. 3C (Blend table 320, and arrays 330, 340, 350, 360)

FIG. 11

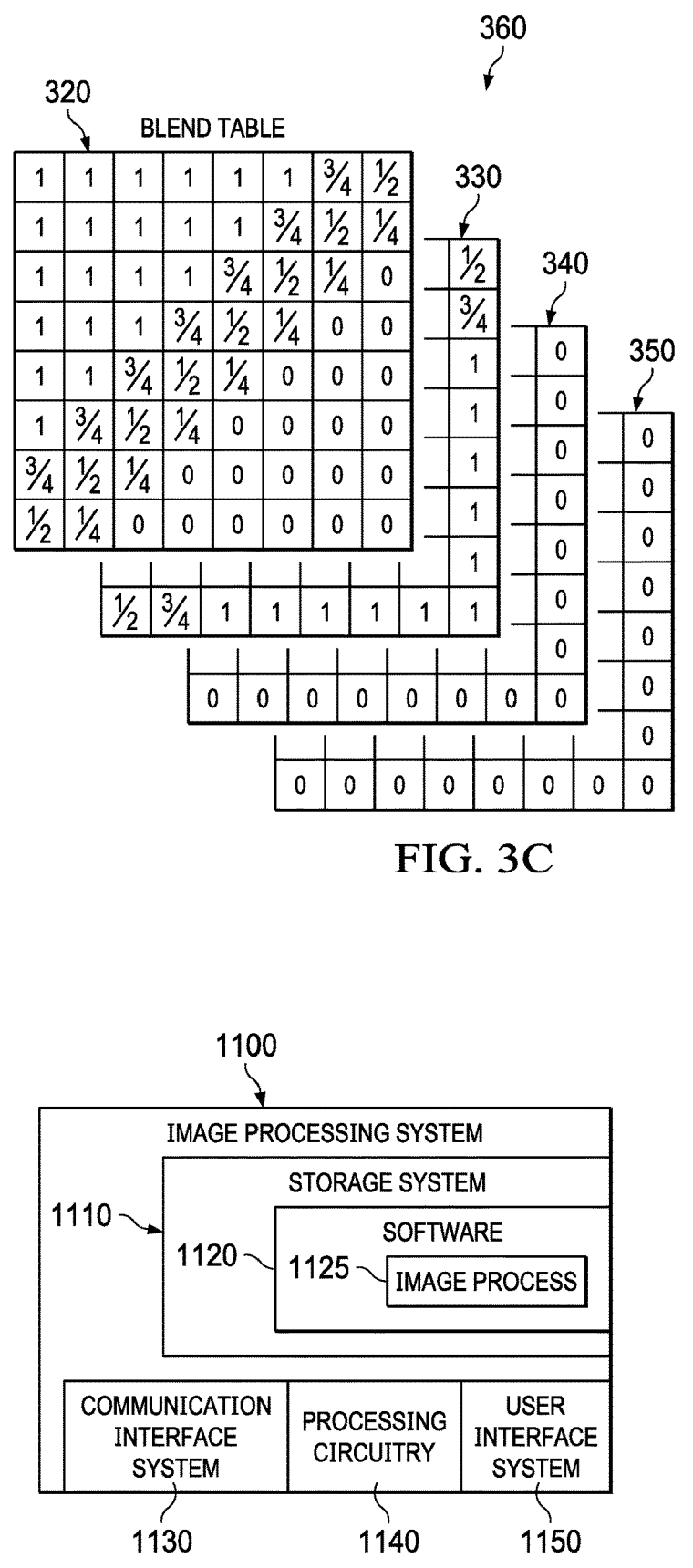

Image Processing System (1100)
- Storage System (1110)
  - 1120
    - Software (1125)
      - Image Process
- Communication Interface System (1130)
- Processing Circuitry (1140)
- User Interface System (1150)

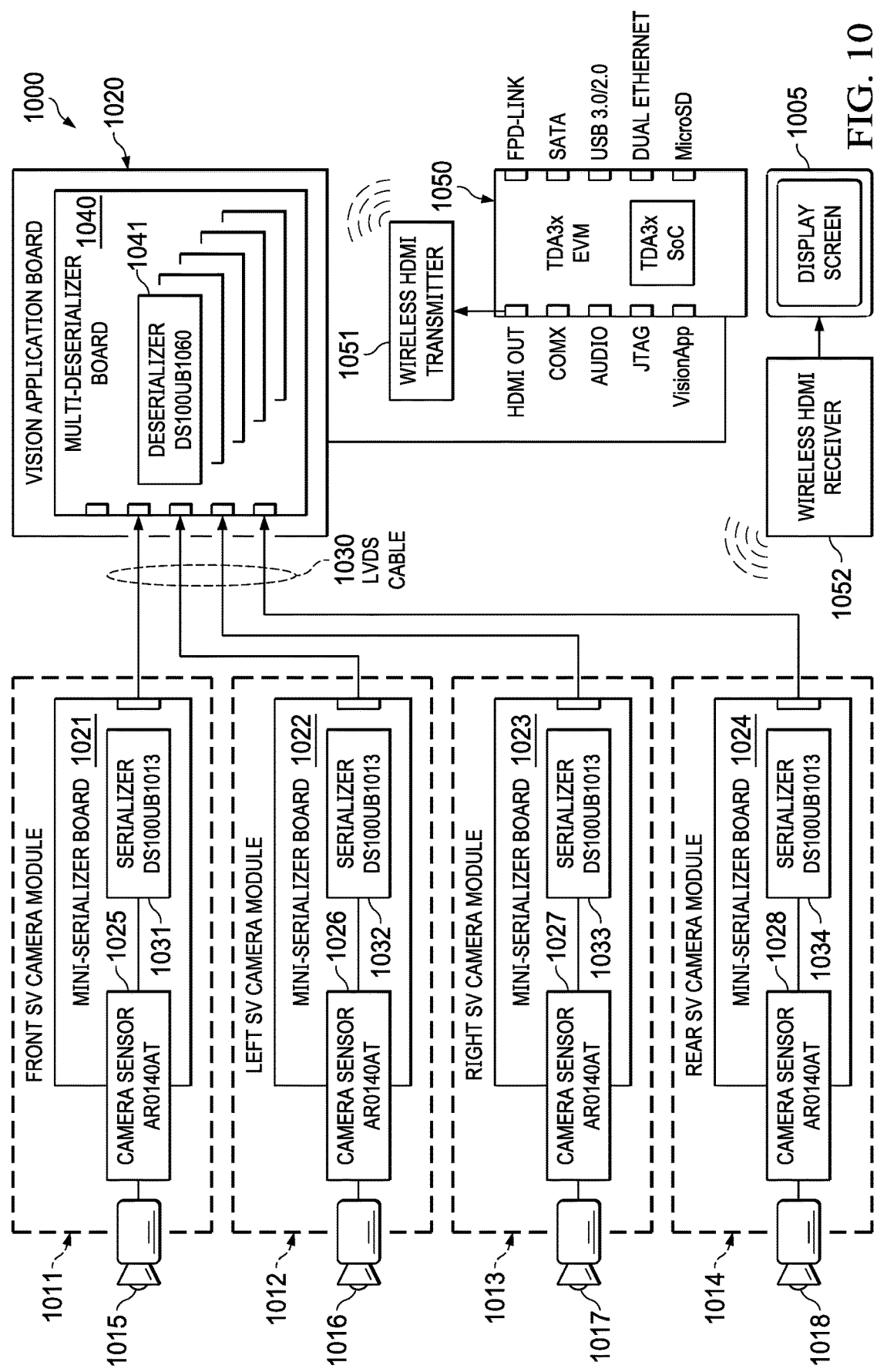

ENHANCED RENDERING OF SURROUND VIEW IMAGES

TECHNICAL BACKGROUND

In a multi-camera environment, a single image may be synthesized from multiple images captured by multiple cameras by stitching together two or more images and blending pixels at their seamlines. Such a technique can be used to produce surround views in automotive vision systems and in other contexts. For example, a surround view system in an automotive context provides a driver with a single two-dimensional image that includes views from all directions. The surround view system on-board the vehicle stitches together multiple images captured by multiple outward facing cameras, positioned around the vehicle, in order to produce the single surround view image.

In a basic scenario, the vantage point of the surround view image is from that of a virtual camera positioned above the vehicle. In other words, the image is produced as-if it were taken by a virtual camera from a virtual viewpoint. The surround view system maps the pixels in the images captured by the various cameras on the vehicle to the surround view image and displays the resulting surround view image to the driver on a screen. In addition to mapping the pixels, the system stitches together the images at the seamlines, which includes blending pixels where two images overlap.

In more complex scenarios, the virtual viewpoint may be from any arbitrary position such as from an angle, from behind the vehicle, or from the side. Some solutions utilize graphics processing units (GPUs) to handle the pixel remapping on-board and in real-time for arbitrary virtual viewpoints. Unfortunately, GPU-based solutions are expensive from both a cost and an overhead perspective Some GPU-less solutions determine the pixel remapping configuration and only for a limited number of predetermined vantage points. The predetermined remapping may thus be called upon on-board and in real-time to quickly produce a virtual image from one of the predetermined vantage points. While fast and low overhead, such solutions can produce inaccurate stitching in some scenarios, resulting in artifacts like blended pixels where none should be blended and vice-versa.

Overview

Technology is disclosed herein that enhances the rendering of surround view images in multi-camera scenarios. In various implementations, a configuration process generates a three-dimensional surface representation of a scene from pixels in images of the scene captured by multiple image capture devices. The configuration process also defines one or more seamlines in the three-dimensional surface representation and identifies blend weights for the pixels based at least on a proximity of each of the pixels to the one or more seamlines. Still configuration, the process populates a blend table for a virtual image of the scene with the blend weights and partitions the blend table based at least on a cost function having inputs comprising the blend weights of the pixels. In some implementations, the process of partitioning the blend table executes in an offline, off-board, and/or off-chip process.

In the same or other implementations, an on-board and/or real-time and/or rendering process utilizes a blend table having blend weights for constructing a virtual image of a scene from pixels in images of the scene captured by multiple image capture devices. For one or more partitions of the blend table, the rendering process determines based on at least one of the blend weights in the partition, whether a subset of the pixels associated with the partition includes one or more pixels associated with one or more seamlines defined in a three-dimensional surface representation of the scene.

In response to determining that none of the subset of the pixels are associated with the one or more seamlines, the process populates a region of the virtual image corresponding to the partition with pixel values from an image captured by one of the image capture devices. However, in response to determining that one or more of the subset of the pixels is associated with the one or more seamlines, the process populates the region of the virtual image corresponding to the partition with at least one blended pixel value comprising a blend of two or more pixel values from two or more images captured by two or more of the plurality of image capture devices.

This Overview is intended to provide a selection of concepts in a simplified form that the Technical Disclosure describes below. This Overview does not intend to identify or emphasize key features or essential features of the claimed subject matter, nor is it intended to be used to limit the scope of the claimed subject matter.

BRIEF DESCRIPTION OF THE DRAWINGS

FIGS. 3A, 3B, and 3C illustrate a partition of a blend table according to an implementation.

FIG. 10 illustrates an example block diagram of an example of a 3-D surround view system.

FIG. 11 illustrates an image processing system suitable for implementing the various operational environments, architectures, processes, scenarios, and sequences discussed below with respect to the Figures.

TECHNICAL DISCLOSURE

Figure 1:
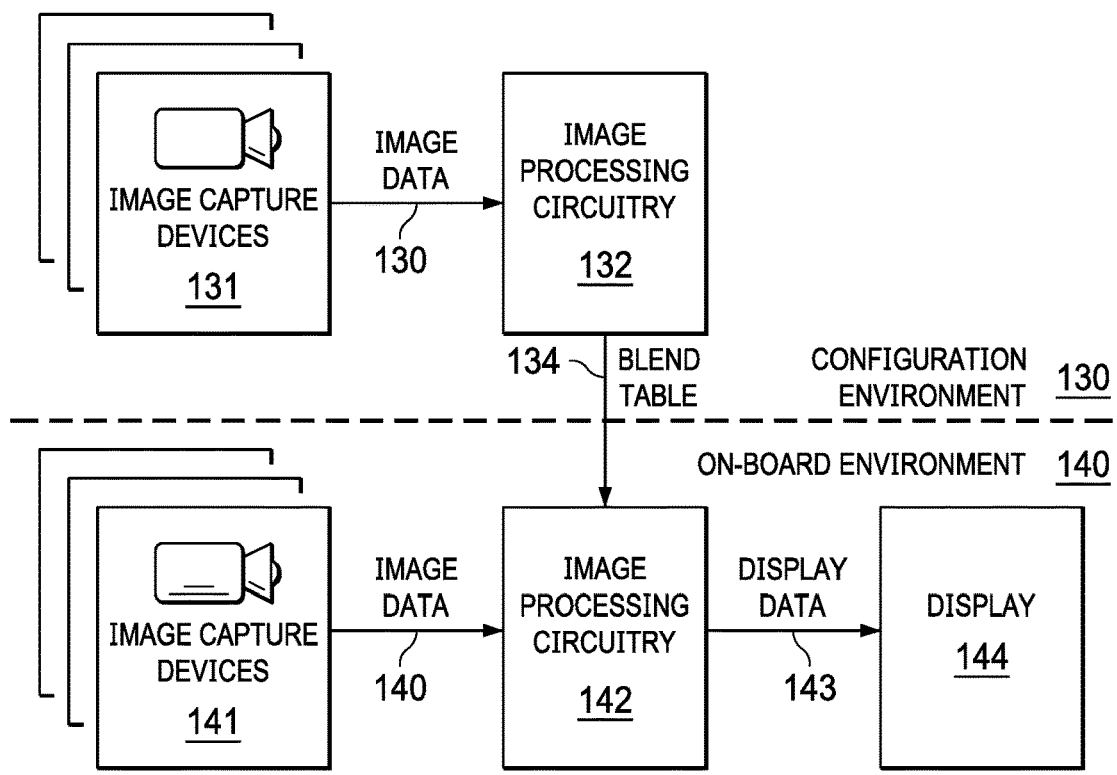
FIG. 1 illustrates a block diagram for an image system producing a surround view according to an implementation.

Technology disclosed herein enhances the rendering of surround view images in multi-camera environments.

As discussed above, the ability to render surround view images without using a GPU reduces the expense and overhead of a surround view system and can increase performance. In order to support virtual viewpoints in such systems involves producing blend tables a priori for each view point that define how the pixels from multiple cameras are to be blended in a final virtual image. The surround view system accesses the blend tables at runtime to determine how to blend the pixels from the live images captured by the cameras so as to mitigate the effect of seamlines where two or more images overlap.

The blend tables for a given virtual view specify weights for blending the pixels from each camera. That is, each blend table corresponds to a different camera and the blend table for a given camera defines how its pixels are to be weighted for a given virtual viewpoint. Pixels that do not correspond to a seamline are weighted such that they are not blended with any other pixel. Pixels that do correspond to a seamline are weighted such that they are blended to a certain degree with one or more other pixels.

An inefficiency exists in this arrangement in that the surround view system expends the overhead of consulting a blend table for every pixel in the images streamed from the cameras—even if a given pixel is not on a seamline. The solutions contemplated herein remove this inefficiency by partitioning the blend tables into tiles, some of which include pixels corresponding to seamlines, and others of which contain no seamline pixels at all. The surround view system can handle the latter types of tiles differently than the former, in that the blend table need not be consulted for pixels that fall within the tiles having no association with a seamline. This new arrangement therefore accelerates the rendering process relative to the previous solutions that consulted the blend tables for every pixel in an image.

Various implementations described herein achieve such an advance by way of a configuration process that populates and partitions a blend table in such a manner that allows a rendering process to execute at runtime in an accelerated fashion. In some examples, the rendering process is implemented in one or more Application Specific Integrated Circuits (ASICs) or a system on a chip (SoC), further accelerating the rendering process.

The configuration process begins by generating a three-dimensional surface representation of a scene from pixels in images of the scene captured by multiple image capture devices. The configuration process maps each pixel to a location on the three-dimensional surface and defines seamlines on the surface where pixels from different cameras overlap.

The configuration process proceeds to identify blend weights for the pixels based on a proximity of each of the pixels to the seamlines and populates a blend table with the weights. The blend weights govern at runtime how the pixels are blended with each other when the rendering process produces a virtual image of the scene from a virtual viewpoint.

The configuration process then partitions the blend table based on a cost function that takes the blend weights as inputs. The cost function may consider other inputs too, such as characteristics of the rendering process. Examples include, but are not limited to, bandwidth per frame, cycles per frame, table storage size, direct memory access (DMA) overhead, and boot time.

The partitioning of the blend table based on the cost function accelerates the rendering process by producing one or more partitions having pixels drawn from only one camera. That is, the partitioning produces one or more partitions having no seamline pixels in them, which accelerates the rendering process by allowing it to skip the blending step for at least some of the pixels in the virtual image. In contrast, prior solutions performed the blending step for every pixel in the virtual image.

The configuration process stores the blend table which, as mentioned, includes blend weights for constructing a virtual image of a scene from pixels in images of the scene captured by multiple image capture devices. The configuration process determines, based on at least one of the blend weights in the partition, whether a subset of the pixels associated with a given partition includes one or more pixels associated with one or more seamlines. If one or more of the subsets of the pixels is associated with a seamline, then the rendering process populates the region of the virtual image associated with the partition with blended pixels from images captured by two or more of the image capture devices. However, if none of the subset of the pixels are associated with the seamlines, the rendering process populates a region of the virtual image corresponding to the partition with pixel values from an image captured by one of the image capture devices, thereby accelerating the production of the virtual image.

The configuration process described above may be performed for various predetermined virtual viewpoints, resulting in blend tables corresponding to the viewpoints. Then at runtime the rendering process can call upon the blend table corresponding to a given virtual viewpoint. As pixels flow from the image capture devices, the rendering process blends some of the pixels and refrains from blending others per the weights in the blend table. If the viewpoint changes, then a different blend table corresponding to the new viewpoint is used by the rendering process to produce the new virtual image as-if the image were taken by a virtual camera from the virtual viewpoint.

Referring now to the drawings, FIG. 1 illustrates a block diagram for an image system configured to produce a surround view according to an implementation. In this example, a configuration environment 130 is configured to model an on-board environment 140 such as a vehicle. In this example, the on-board environment 140 includes multiple image capture devices 141. This configuration of image capture devices is modeled by the image capture devices 131 in the configuration environment 130.

In an example, the on-board environment 140 may include four image capture devices 141 located in front, rear, right, and left positions. The configuration environment 130 models those devices and locations to provide the image processing circuitry 132 with image data corresponding to that which would be obtained from the image capture devices 141 as related to their physical specification including position, view angle, field of view, and the like. Ideally, the image capture devices 131 are the same model as the image capture devices 141.

Where multiple image capture devices are used to provide a surround view of an object, such as a vehicle, the image capture devices are typically configured to provide at least slightly overlapping views. This insures that the entire circumference of the object is covered with no blind spots. This allows for the creation of a 360° view of the surroundings simply by stitching together the views of the four cameras.

However, in order to provide a virtual image from a virtual camera at an arbitrary location and orientation, stitching together the images becomes much more complex. In an example, a 3-D surface representation of the scene is created. For example, by mapping image data to a bowl-shaped surface or mesh. This bowl-shaped surface is defined to surround the model object in the configuration environment 130. Where images from two image capture devices overlap, seamlines are defined within the 3-D surface. These curves are later used to blend pixels drawn from the images produced by the image capture devices.

In some examples, the seamlines between two image capture devices may have a finite width. This width is the area where images from at least two image capture devices will be blended together to produce the final image of the scene. A blend table is a matrix of cells or a grid that are used to define locations where these multiple image capture device pixels are to be blended together and to what extent the pixels are blended. For example, a blend table for a given camera specifies a blend weight for each pixel in the images captured by the camera. Pixels that will not be blended may have a blend weight of zero, whereas pixels that are to be blended with pixels from other cameras will have a blend weight greater than zero. The pixels may be identified in the blend table by their location in an image or by some other convention. The blend table includes a coordinate system with axis based on pixel number (e.g. x axis is in pixels dimensions and the y-axis is in pixel dimensions)

Here, a virtual image capture device is defined by parameters including location, orientation, view angle, view area, resolution, and the like. Geometric transformations are used to determine which cameras contribute to which pixels of the virtual image. Similarly, the seamlines are geometrically translated into the virtual view within a blend table.

The blend table provides a representation of the virtual image including the seamlines between image capture devices that have been geometrically translated into the virtual image. Since the virtual image includes image data from each of the image capture devices, the blend table includes several or more seamlines. Portions of the blend table where image data from a single image capture device is used to produce the virtual image contain no seamlines, and these portions of the virtual image are quickly produced from simple geometric translations of the image from the single image capture device.

Portions of the blend table including seamlines require more complex calculations as the images from two or more cameras must be combined to create these portions of the virtual image. By careful partitioning of the blend table, some partitions will include seamlines and some partitions will not. Those partitions without seamlines require less processing than those partitions with seamlines, so it is desirable to have as many large partitions without seamlines as possible.

In an example, a cost function is used in partitioning the blend table into partitions providing for increased processing of the image data into the virtual image. The cost function is iteratively applied while varying the size and shape of the partitions until a minimum cost is found. In an example implementation, the partitions are rectangular in shape and the lengths of their sides are multiples of 32 pixels for increased speed of memory access. The cost function is described in further detail below.

Once the configuration environment 130 has produced a partitioned blend table 134 for the desired virtual image, the partitioned blend table 134 may be provided to the image processing circuitry 142 within the on-board environment 140. The image processing circuitry 142 receives image data captured by the image capture devices 141, uses the partitioned blend table 134 to produce a virtual image, and transfers the virtual image as display data 143 to the display 144 within the on-board environment 140.

Figure 2A:
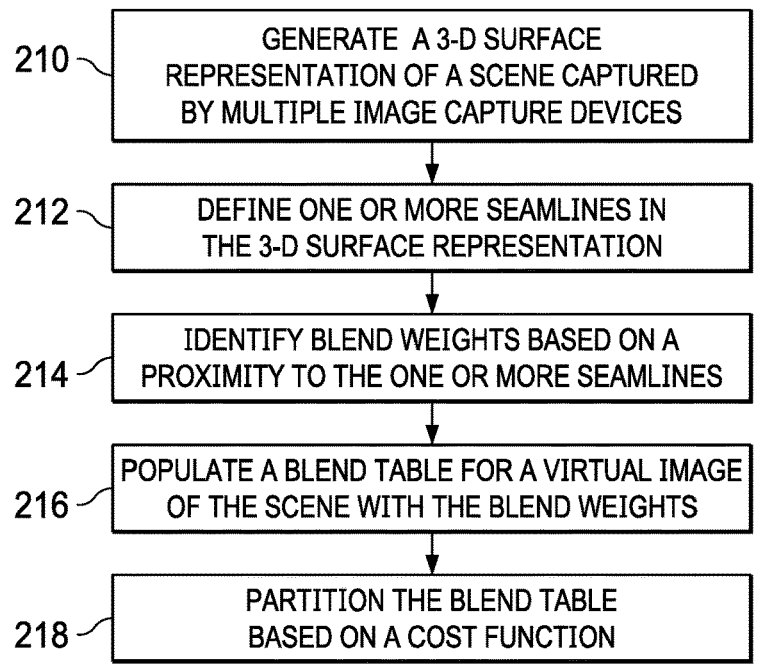
FIGS. 2A and 2B illustrate methods for multi-camera pixel remapping and stitching a synthesized image using tile mapping tables.
Figure 2B:
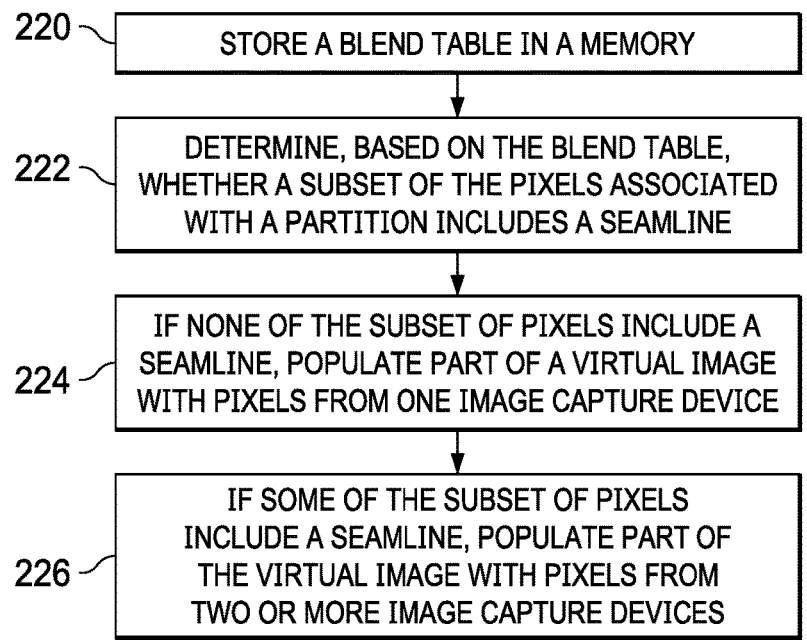

FIGS. 2A and 2B illustrate methods for multi-camera pixel remapping and stitching a synthesized image using tile mapping tables.

FIG. 2A illustrates a method for producing a synthesized image using tile mapping (blend) tables within the configuration environment 130. The image processing circuitry 132 generates a three-dimensional surface representation of a scene from pixels in images of the scene captured by multiple image capture devices 131, (operation 210).

The image processing circuitry 132 defines one or more seamlines in the three-dimensional surface representation, (operation 212). The image processing circuitry 132 identifies blend weights for the pixels based at least on a proximity of each of the pixels to the one or more seamlines, (operation 214).

The image processing circuitry 132 populates a blend table for a virtual image of the scene with the blend weights, (operation 216). The image processing circuitry 132 then partitions the blend table based at least on a cost function having inputs comprising the blend weights of the pixels, (operation 218).

FIG. 2B illustrates a method for producing a synthesized image using tile mapping (blend) tables within the on-board environment 140. The on-board environment 140 receives a partitioned blend table 134 from the configuration environment 130 and stores the partitioned blend table 134 in a memory, (operation 220). The partitioned blend table 134 includes blend weights for constructing a virtual image of a scene from pixels in images of the scene captured by a plurality of image capture devices 141.

The image processing circuitry 142, determines, based on at least one of the blend weights in the partition, whether a subset of the pixels associated with the partition includes one or more pixels associated with one or more seamlines defined in a three-dimensional surface representation of the scene, (operation 222).

In response to determining that none of the subset of the pixels are associated with the one or more seamlines, the image processing circuitry 142 populates a region of the virtual image corresponding to the partition with pixel values from an image captured by one of the multiple image capture devices 141, (operation 224).

In response to determining that one or more of the subset of the pixels is associated with the one or more seamlines, the image processing circuitry 142 populates the region of the virtual image corresponding to the partition with at least one blended pixel value comprising a blend of two or more pixel values from two or more images captured by two or more of the multiple image capture devices 141, (operation 226).

Figure 3A:
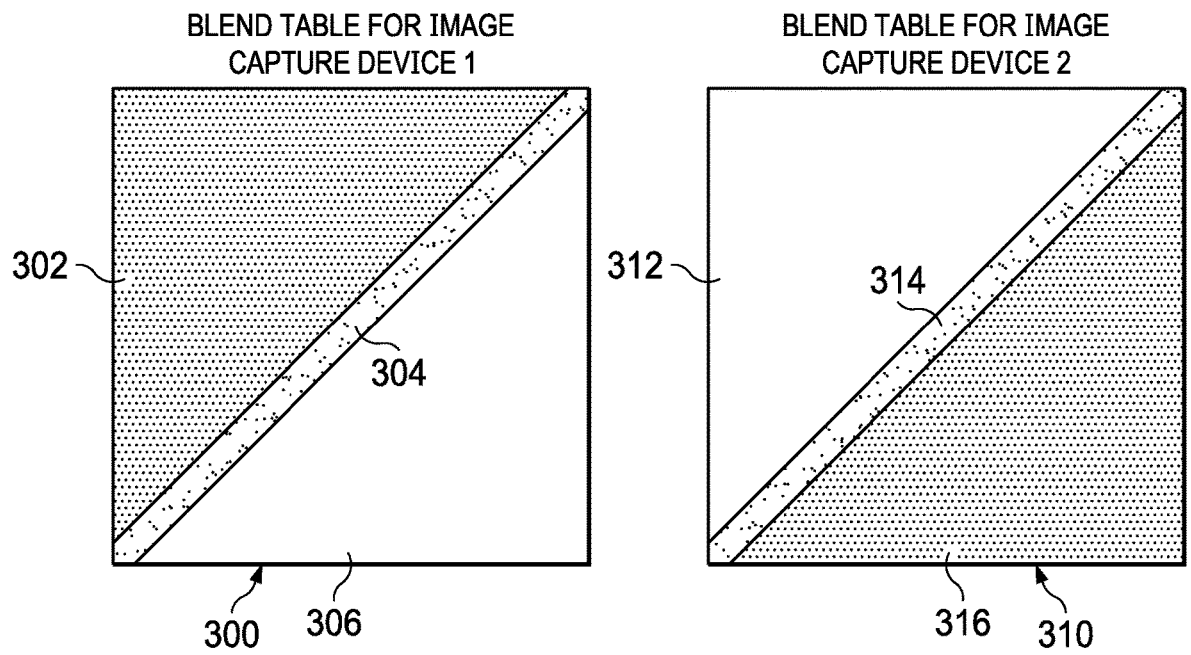

FIGS. 3A, 3B, and 3C illustrate a partition of a blend table according to an implementation. In this example, a small partition of a blend table including a seamline is described in detail. FIG. 3A illustrates a partition of an example blend table for the image capture device 1 300 and another example blend table of the image capture device 2 310 at one predefined virtual viewpoint.

The partition of the blend table for the image capture device 1 300 includes three regions. The upper-left region 302 is where only the image capture device 1 is to be used in producing the virtual image. The lower-right region 306 is where the image capture device 1 is not to be used in producing the virtual image. The seamline 304 is where image data from the image capture device 1 is to be blended with image data from the image capture device 2 to produce the virtual image.

Likewise, the partition of the blend table for the image capture device 2 310 includes three regions. The upper-left region 312 is where the image capture device 2 is not to be used in producing the virtual image. The lower-right region 316 is where only the image capture device 2 is not to be used in producing the virtual image. The seamline 314 is where image data from the image capture device 2 is to be blended with image data from image capture device 1 to produce the virtual image.

FIG. 3B illustrates a portion of the blend table partition from FIG. 3A containing the seamline. In this example, each cell within the blend table corresponds to a single pixel within the final virtual image.

Blend tables for each of four image capture devices are illustrated including their blend values for each pixel. The blend table for the image capture device 1 320 includes cells 322 having values of 1 for the upper-left region, cells having values of 0 for the lower-right region, and cells having values of ¼, ½, and ¾ within the seamline. The blend table for the image capture device 2 330 includes cells 332 having values of 0 for the upper-left region, cells having values of 1 for the lower-right region, and cells having values of ¼, ½, and ¾ within the seamline. The blend tables for image capture device 3 340 and image capture device 4 350 include cells 342, 352 having values of 0 since these two image capture devices are not used in producing this portion of the virtual image.

Note that for each cell 322, 332, 342, 352, includes a blend value for a pixel from each respective image capture device 1, 2, 3, 4 within the portion of the respective partitions of the blend tables 320, 330, 340, 350. In the illustrated embodiment, the blend values for the four image capture devices 1, 2, 3, 4 sum to 1. In other embodiments, they may sum to any number. The value of 1 is used here strictly for exemplary purposes.

FIG. 3C illustrates how the blend tables 320, 330, 340, 350 for each of the image capture devices are combined in to a final blend table 360 as a three-dimensional array of blend values. Note that FIG. 3C illustrates only a portion of a single partition of a blend table for illustrative purposes. The complete blend table is much larger.

Figure 4:
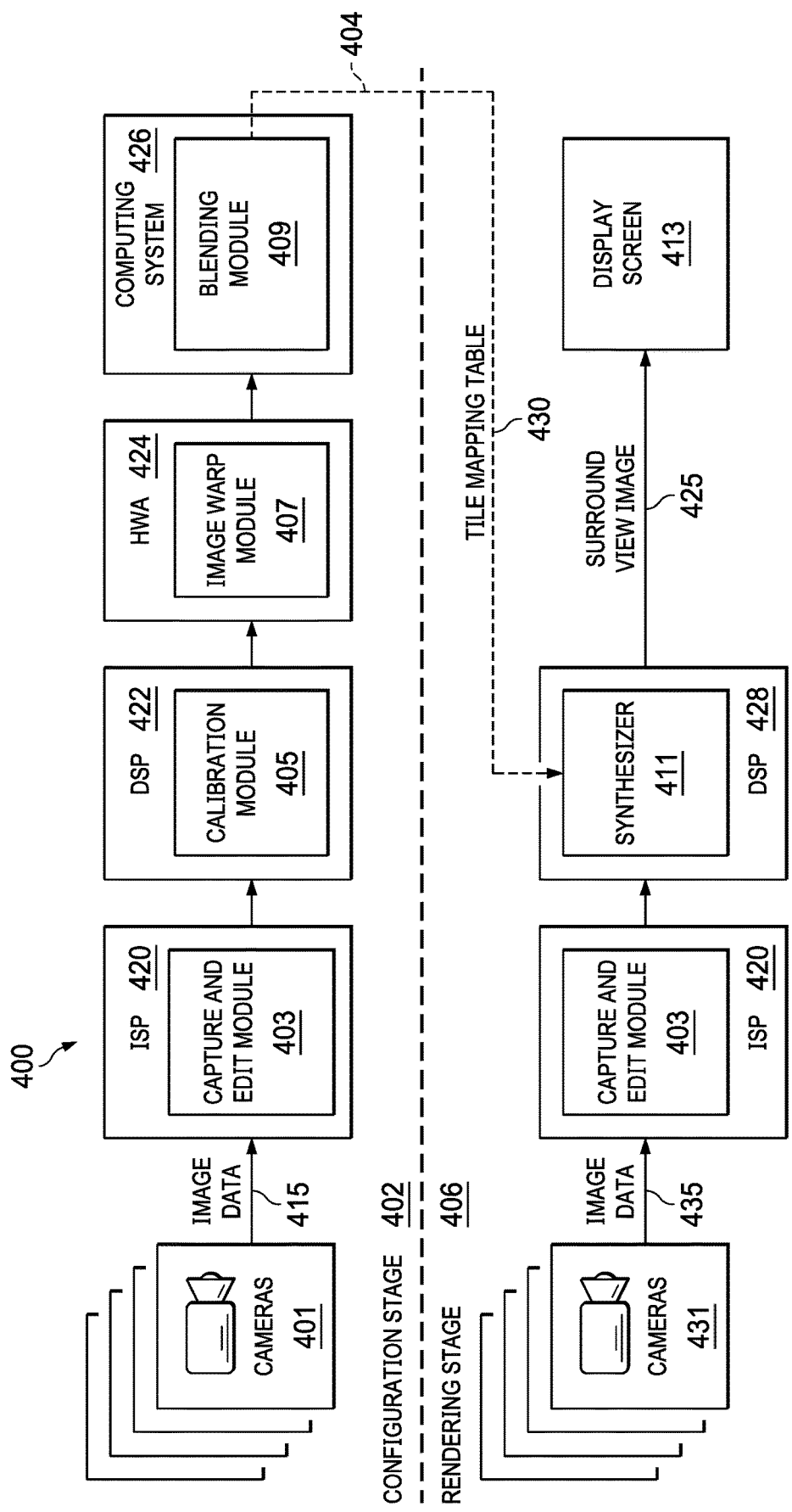
FIG. 4 illustrates a pictorial flow diagram illustrating a process for producing a surround view according to an implementation.

FIG. 4 is a pictorial flow diagram illustrating a surround view architecture 400 for producing a surround view. A video stream or image frames of image data 415 from cameras 401 flows to a computing system, such as an image signal processing system (ISP) 420 having a capture and edit module 403. The edited images flow to a computing system, such as digital signal processor (DSP) 422 having a calibration module 405. The calibrated images flow to a computing system, such as a hardware accelerator (HWA) 424 having an image warp module 407. The geometrically transformed images flow to a computing system 426, such as a personal computer having a blending module 409. Partitioned blend tables or tile mapping tables flow to a DSP 428 having a synthesis module or synthesizer 411 to output a surround view image 425 onto a display screen 413.

In one implementation, the surround view architecture 400 employs two sub-stages: a configuration stage 402 and an on-board or a rendering stage 406. The configuration stage 402 utilizes the calibration module 405, the image warp module 407, and the blending module 409, while the rendering stage 406 utilizes the image warp module 407, the synthesizer 411, and display screen 413. In some implementations, the configuration stage 402 is representative of includes an offline stage (e.g. blending module 409) employed to generate partitioned blend tables, while the rendering stage 406 is representative of a real-time stage that operates at runtime on one or more ASICs, an SoC, or the like, on board a vehicle or other such environment. Portions of configuration stage 402 (e.g. blending module 409) may be implemented by one or more computers, of which image processing system 1100 in FIG. 11 is representative.

The output of the configuration stage 402 is a partitioned blend table or tile mapping table 430 for each of a set of predetermined viewpoints. The partitioned blend tables or tile mapping tables 430 may be stored in memory (e.g. on-board, on the DSP 428, and/or on a vehicle) and used by rendering stage 406 in operation. In certain embodiments, configuration stage 402 and rendering stage 406 could be combined into a single process deployed on-board a vehicle (depicted as dashed line 404).

In some implementations the surround view architecture 400 uses several wide-angle (e.g. fisheye lens) cameras 401, each mounted to a specific point, e.g. the front, sides, and back of a vehicle and each having an image, video, or camera sensor. The cameras 401 are Bayer format cameras and stream at a pre-defined rate or frames per second (e.g. 30 f/s). Each camera produces image data 415 and may provide the image data 415 to the ISP 420. The cameras 401 may stream images to ISP 420 in a synchronized or asynchronous manner. ISP 420 may include a buffer for storing frames as they arrive.

ISP 420 includes capture and edit module 403. Capture and edit module 403 captures the image data 415 from cameras 401. Capture and edit module 403 may also perform corrective operations such as conversion from Bayer format to YUV format, color tone mapping, noise filtering, and gamma correction on the image data 415. Capture and edit module 403 may perform calibration functions such as automatic exposure control and white balancing on the image data 415 to achieve superior image quality. Capture and edit module 403 also synchronizes cameras 401 to ensure that each frame in the image data 415 captured from the cameras 401 is in the same time period.

A portion of configuration stage 402 may execute on a DSP 422. For example, the calibration module 405 may be implemented on DSP 422. Calibration module 405 may include calibration parameters such as a fisheye lens distortion correction (LDC) and perspective parameter. As an example, for LDC, calibration module 405 may use a radial distortion model to remove fisheye distortions from original input frames by applying the inverse transformation of the radial distortion function. After LDC, extrinsic calibration may estimate matrices, one for each camera. The matrices transform a number of input LDC-corrected frames of the image data 415 to an output view in a single world coordinate system. The single world coordinate system alters translation and rotation into an assembled grid, each pixel being mapped to a point. Calibration module 405 may use a chart-based or a table-based calibration approach. A chart-based approach assumes that an object with precisely known geometry (e.g. a chart in a fixed position) is present in all input images and computes the camera parameters consistent with a set of correspondences between the features defining the known geometry (the chart) and the observed image projections. A table-based approach (used herein) creates look-up tables saved to memory that may rank the cameras according to how well they image a specific location for all possible locations within the camera's viewing spectrum. It some implementations, several cameras may be mapped to a single location creating an overlap.

In some implementations, the configuration stage 402 may complete once when a vehicle is first assembled or when the cameras are positioned initially. In certain embodiments, the configuration stage 402 changes based on the arrangement of the cameras.

The configuration stage 402 employs an automatic calibration procedure using calibration charts placed on the ground around a vehicle. The calibration module 405 may also perform a photometric alignment. Due to different scene illuminations during the calibration process, different camera auto exposure (AE), and different auto white balance (AWB), the color and brightness of the same object captured by different cameras can be different. As a result, an output stitched composite image can have noticeable photometric differences between two adjacent views (e.g., camera input). The goal of photometric alignment for a surround view system is to match the overall brightness and color of different images, such that the composite view appears as if a single camera placed in an arbitrary location (a predetermined virtual camera location) took it. To achieve that, a global color and brightness correction function is designed for each view such that the discrepancies in the overlapping regions of adjacent views are reduced.

Calibration module 405 also performs ray tracing to create a set of mesh or viewpoint tables. In certain embodiments, calibration module 405 performs the ray tracing process offline. Performing the ray tracing process offline allows calibration module 405 to perform the computationally intensive task of ray tracing for specific viewpoints (e.g. those viewpoints advantageous to a driver) during a lull, design phase, or production phase and store the results for use during real-time image rendering.

Ray tracing requires a bowl reference plane. A bowl reference plane or mesh is bowl shaped and has a flat portion and raised portions that define the surround view output image plane. The flat portion represents the ground of a landscape and the raised portion defines the outer limits of the camera viewing area. The bowl reference plane allows a virtual camera to be positioned at a pre-defined virtual viewpoint or virtual camera location (e.g. overhead, behind, etc.). The ray tracing process measures the flat portion of the bowl reference plane in a physical distance (e.g. 40 meters). For example, mapping image data provided by cameras 401 (e.g. a single pixel) to a location on the output image bowl plane involves casting a ray from a 2-D location in the output image plane of a specific camera and identifying the location that the ray intersects the bowl reference plane.

In response to the location on the bowl reference plane being identified, the camera calibration matrices generated in the configuration stage 402 may map the location on the bowl reference plane from a 2-D location in the image data 415 from each of the cameras 401. The configuration stage 402 maps every pixel point from image data 415 onto the bowl reference plane with X, Y, and Z coordinates of the bowl reference plane or mesh and saves these coordinates in a mesh or viewpoint table. This approach may perform for each location in the 2-D image plane for the 3-D bowl reference plane at various virtual camera locations to create a pre-defined viewpoint table.

During the portion of configuration stage 402 performed by calibration module 405, the pre-defined viewpoint table and the camera calibration parameters feed a processor, such as a DSP 422. The DSP 422 converts each pre-defined viewpoint table in combination with the camera calibration parameters for each of the cameras 401 at a pre-defined viewpoint into a calibrated viewpoint or mesh table. The configuration stage 402 stores the calibrated viewpoint tables in a memory accessible by the HWA 424 and the same or a different DSP. Blending module 409 may sequentially re-use calibrated viewpoint tables. In certain embodiments, the memory can be accessible when the ASIC or SoC is operating in an offline mode, so that a computing system 426 (e.g. personal computer) may access the information as will be further explained below.

The surround view architecture 400 may perform their operations when the system starts, but not again thereafter. For example, when the system is placed in a vehicle during an assembly process. The processes supported by the surround view architecture 400 may repeat whenever sensing a physical location change for one of the cameras or a new unsaved virtual viewpoint is selected. In some examples, configuration stage 402 may repeat each time a vehicle starts.

The HWA 424 includes image warp module 407. Image warp module 407 executes an image warp process. For example, the TDA3x, J7/TDA4x SoC available from Texas Instruments Incorporated (TI) includes an image warp module. The TDA3x SoC is based on a heterogeneous, scalable architecture that includes TI's fixed- and floating-point dual-TMS320C66x generation of DSP cores, a fully programmable Vision AccelerationPac (EVE) and dual ARM® Cortex®-M4 cores along with an image signal processor (ISP). The TDA3x SoC also integrates a host of peripherals including displays, CAN, and multi-camera interfaces (both parallel and serial) for low voltage differential signaling (LVDS) based surround view systems.

The calibrated viewpoint table needed by HWA 424 is a sub-sampled array of such mappings from each camera to output a surround bowl plane. Image warp module 407 may include a lens distortion correction (LDC). Image warp module 407 moves patches of data from one frame buffer to another according to an image warping method or calibrated viewpoint lookup table. Image warp module 407 receives a calibrated viewpoint mesh look-up table for all video channels (e.g. cameras) at all viewpoints and stores them. Image warp module 407 also maintains a relation between a given virtual viewpoint and an associated set of the calibrated viewpoint lookup tables, along with metadata. The metadata may include, but is not limited to, the output size of a video frame for each channel, frames per second, processing parameters (such as block width/height), and corresponding virtual viewpoints.

The image warp module 407 retrieves the calibrated viewpoint lookup tables, establishes processing parameters, and associates an appropriate mesh table for each camera. In one example, image warp module 407 executes offline and the calibrated viewpoint lookup tables are stored in memory for easy access by the on-board or rendering stage 406. In one implementation, a non-volatile memory may store the received calibrated viewpoint look-up tables so that they are available when the system starts. In another implementation, a volatile memory may store the calibrated viewpoint lookup table, which may require reloading each time the system powers on.

Image warp module 407 processes one video frame from each of cameras 401 sequentially. In some implementations, the cameras 401 may have individual camera channels. Before HWA 424 processes the feed from each camera, HWA 424 is configured with the associated processing parameters. HWA 424 processes each input frame as a set. The set of input frames of the image data 415 include input frames from each camera synchronized with one another. A set of input frames of the image data 415 may be pre-defined and then called sequentially at 30 frames per second, for example, to produce a surround view image 425 in real time of the surrounding neighborhood. Synthesizer 411 employs the tile mapping table 430 to generate the output surround view image 425 for a given virtual viewpoint.

Blending module 409, executed by a computing system 426, produces the blend weights that populate partitioned blend tables. Each of the cameras 401 has a field of view contained in a half space in the bowl plane, where an origin is defined at the center of the bowl and half spaces are defined as:

Front half space (HS_F): y>0
Right half space (HS_R): x>0
Back half space: (HS_B): y<0
Left half space (HS_L): x<0

For any given point on the bowl plane, at most a number (k−1) of cameras 401 can observe that point (where k is any integer). For example, if the surround view image 425 is looking at the back of a vehicle to zoom into a hitch view, then the synthesis of the surround view image 425 may not need a front camera(s).

Figure 5:
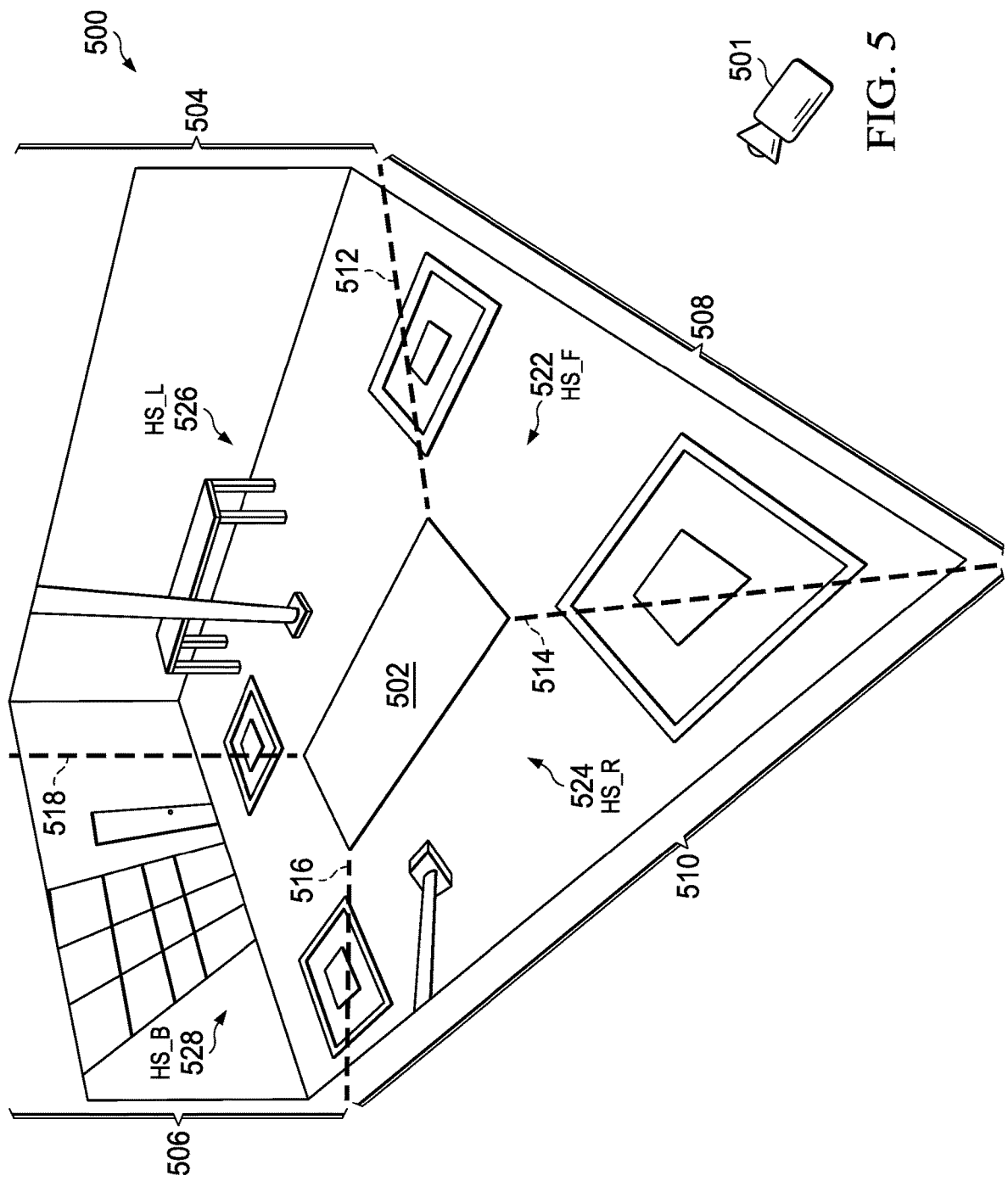
FIG. 5 illustrates a composite surround view with a diagonal set virtual camera viewpoint using a bowl reference plane according to an implementation.

FIG. 5 illustrates a 3-D surround view image 500 produced for a diagonal looking virtual viewpoint using a 3-D bowl mesh looking towards the back and left spaces 526, 528 at a fixed viewpoint (e.g. virtual camera 501). In this example, the fixed virtual viewpoint is diagonal to a dead zone 502. In some implementations, the dead zone 502 may be a location where a scale model vehicle would be located. An upper portion 504 of the surround view image 500 is derived from the raised portion 506 of a bowl mesh, while a lower portion 508 is derived from the flat portion 510 of a bowl mesh.

FIG. 5 illustrates four seamlines represented by seamline 512, seamline 514, seamline 516, and seamline 518. FIG. 5 also illustrates four half spaces represented by HS_F 522, HS_R 524, HS_L 526, and HS_B 528 for four cameras in a bowl referenced surround view image. The seamlines (or blending lines) will vary based on the location of the virtual viewpoint. The offline generated calibrated viewpoint lookup mesh tables or a blend table encodes this information for a given viewpoint.

Each of seamlines 512, 514, 516, and 518 defines overlapping regions or portions of the image frames of the image data 415 that come from the same physical world but captured by at least two adjacent cameras. Such a relationship can be expressed as follows: O{m,n}, where m=1, 2, 3, 4, N and n=(m+1) mod N. O{m,n} refers to the overlapping region between a camera m and a camera n, and where a view n is the neighboring view of a view m in clockwise order. At each location in O{m,n}, there are at least two pixels available, e.g., the image data 415 from the view m and its spatial counterpart the view n. The example discloses two overlapping regions, but there may be more (e.g. three cameras overlapping).

Seamlines 512, 514, 516, and 518 can be represented as SL_<ij> and are 2-D curves in the bowl's x-y plane in the intersection of half-space HS_<i> and HS_<j>. For example, seamline 512 <F,R> is a curve in the half spaces HS_F 522 and HS_R 524. Seamlines 512, 514, 516, 518, expressed as SL_<ij>, each induces a 2-D curve SL<ij>_V in the bowl reference plane by projecting the curve on the virtual camera.

Blending module 409 traces out seamlines 512, 514, 516, 518 and their neighborhoods in the bowl coordinates (e.g. [Y, U, V]). In the overlapping regions or seamlines 512, 514, 516, 518, blending module 409 can either blend the image data 415 from the two adjacent image frames of the image data 415 or make a binary decision to use data from one of the two image frames of the image data 415. Blending module 409 associates weights to given pixels in accordance with an alpha-blending technique (e.g. weighted between 0 and 1, wherein all weights sum to 1). In another example, the associated weights may be a weighted average for all pixels associated with each camera, (e.g. with 3 cameras in the blend, each would be given a 0.3333 weighted average). The weights are pre-stored in a conceptual blending table for each one of cameras 401 at a pre-defined viewpoint. In some implementations, the conceptual blending table may not need to store weights having a value of 1, thereby saving some memory capacity and computational time in calling the conceptual blending table.

In this implementation, the technical disclosure describes four cameras (e.g. front, back, left and right), but the same principals disclosed herein may extend to a number (k) of cameras in other examples, where k may be a number greater than one.

Figure 6:
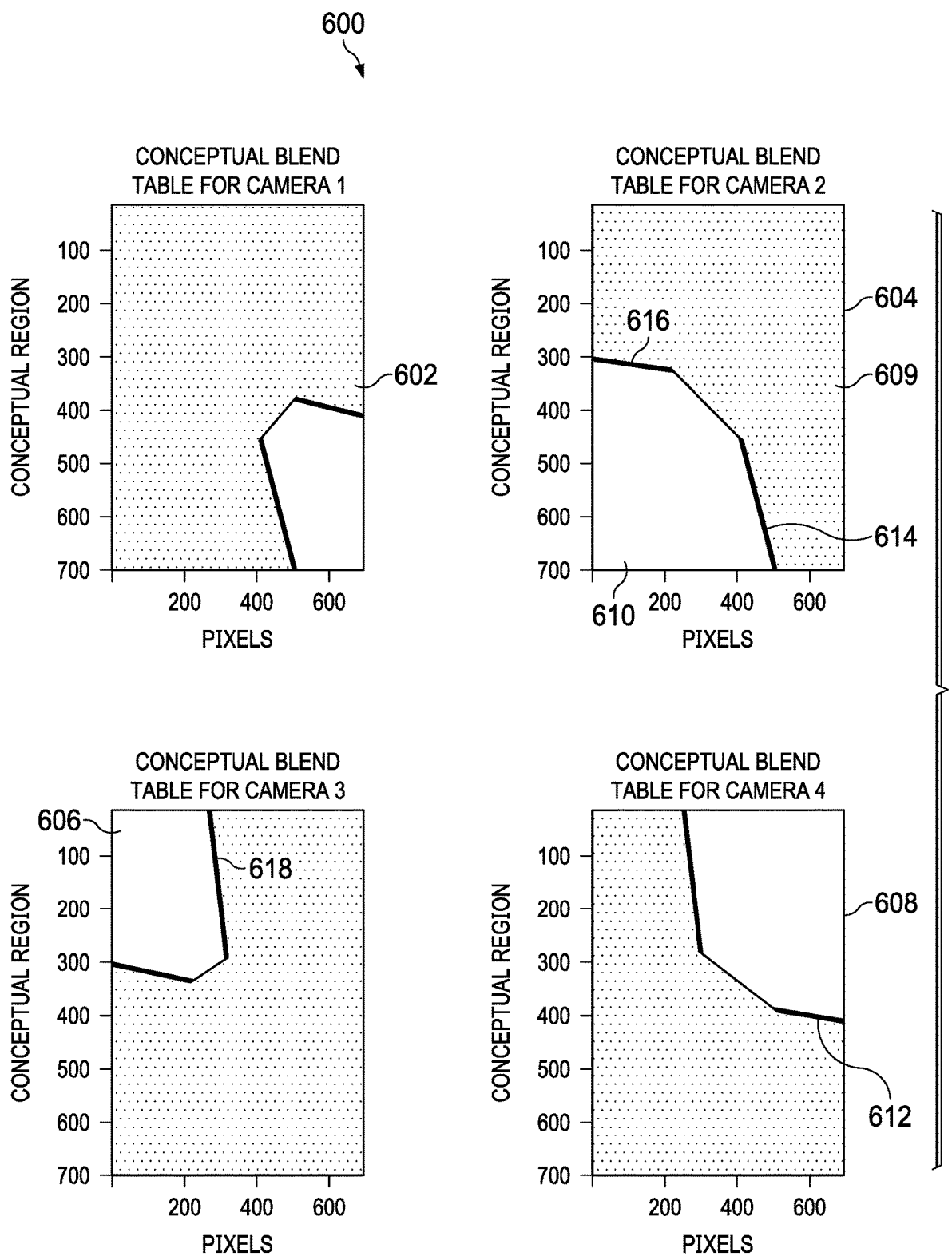
FIG. 6 illustrates a set of blending tables with their associated seamlines according to an implementation.

FIG. 6 illustrates a set 600 of conceptual blending tables 602, 604, 606, 608. The conceptual blending tables define a number (k) of planes, wherein there is one plane per camera. In the illustrated example of FIG. 6, there are four planes (e.g. k=4) for the four cameras represented by cameras 401 in FIG. 4. Each one of conceptual blending tables 602, 604, 606, 608 illustrates a scale (e.g. weight) from 0 to 1. A dark region 609 represents pixels having a weight of 0 and a light region 610 represents pixels having a weight of 1. The regions near the seamlines 612, 614, 616, and 618 are blending areas that have varying weights between 0 and 1.

For example, in an alpha-blending technique all weights of the pixels at the same location sum to 1 for all four the conceptual blending tables 602, 604, 606, 608. Away from the seamlines 612, 614, 616, 618, where there is no blending, the weight associated with pixels from a specific camera will be 0 per image pixel (dark region 609) and 1 per image pixel (light region 610). The seamlines 612, 614, 616, 618, correspond to the seamlines 512, 514, 516, 518, illustrated in FIG. 5. In another implementation, a separate bowl blending table or conceptual blending table saves the weights of each individual virtual pixel.

Figure 7A:
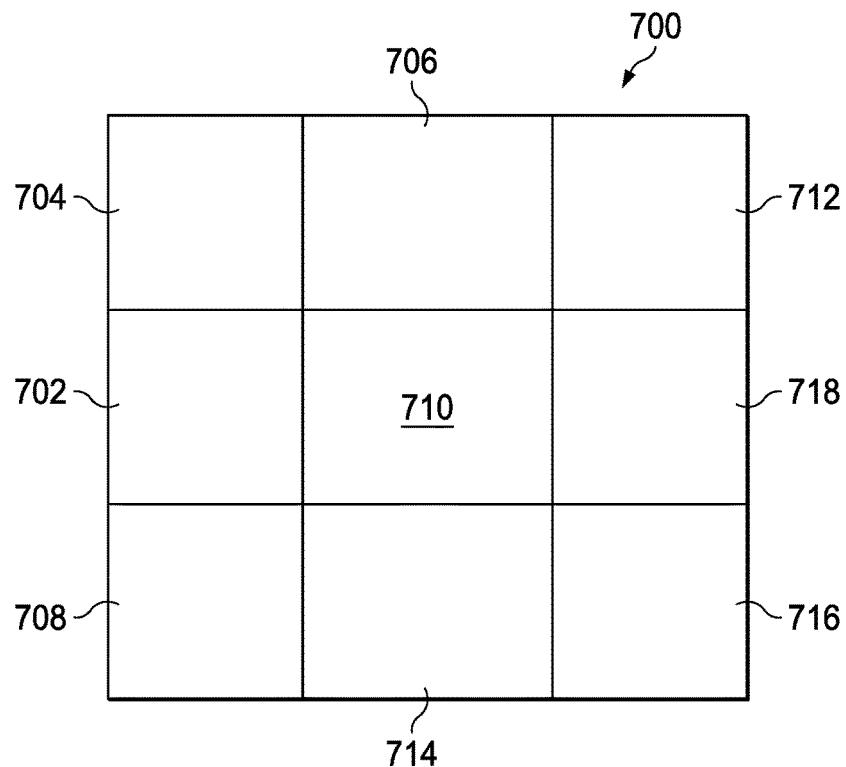
FIG. 7A illustrates an initial tile mapping table with tiles according to an implementation.

FIG. 7A illustrates a potential or candidate tile mapping table 700 partitioned into nine tiles 702, 704, 706, 708, 710, 712, 714, 716, 718. The boundaries of the candidate tile mapping table 700 are in pixels. The central tile 710 is a dead zone or car box, where no blending occurs, and the candidate tile mapping table may overlay an image of a vehicle in the central tile 710. The tiles 702-718 are rectangular in shape. Tiles 702-718 may have edges with lengths of the size of a bus burst or how much data the bus will allow through in a single transaction (e.g. multiples of 32 pixels), to ensure a good memory alignment for direct memory access (DMA) transfers to and from a DSP 422. Tiles 702-718 may be any shape. In some embodiments, the candidate tile mapping table 700 may partition into any number of tiles prior to beginning the process.

In certain embodiments, tiles 702-718 may be in DMA friendly dimensions (e.g. 32 pixels in a tile). In one example, each tile includes a diversity index defined as the number (1 to k) of cameras being used in the respective tile, and the (1 to k) cameras are identified within the tile. The desired output is the weighted sum of the transformed images, given by:

$$I_{out}(x,y) = \text{sum}_k(B_k(x,y) * T_k(I_k)(x,y)) \tag{1}$$

for each output pixel (x,y) in the output pixel domain O. Where $I_k$ is a set of a number (k) of images, $T_k$ is a set of geometric calibrated image transformations (mapping input pixels to output domain O (e.g. bowl mesh)), and $B_k$ is a set of a number (k) of blending maps or blend tables (e.g. where the weights of the pixels at the same location in domain O are non-zero). Surround view architecture exploits the fact that many $B_k$ may be zero.

The tile mapping table method exploits this feature by putting a tile, domain, or region of interest (ROI) for the ISP 420 processing and a remap engine size for the HWA 424 to more superiorly gather (back map) the streaming image data 415 from the cameras 401 through the various tables (Tk, Bk) to output a surround view. In certain embodiments, the HWA 424 operates with one camera stream at a time. The tiling of the output pixel in domain O is defined as a set $\{O_n\}$, where n=1 . . . N, of non-overlapping connected subsets (tiles) of O whose union is O., e.g., $\cup n(On)=O$. Using a tiling $\{O_n\}$, the equation can be rewritten as:

$$I_{out}|On=\text{sum}_k(B_k|On.*T_k(I_k)|O_n) \text{ for } (x,y) \text{ in } O_n \quad (2).$$

The diversity index (dn) of a tile $O_n$ is the number (k) of camera indices, for which $B_{kn}$ is not all zeros (equivalently: for which $B_n>0$ for at least one (x,y) in $O_n$). Let $J_n$ be the set of k's for which $B_{kn}$ is not all zeros. Then, the k's for which all $B_{kn}$ are zero can be discarded from the output image computation and can be written as:

$$I_{out}|O_n=\text{sum}\{k \text{ in } J_n\}(B_{kn}.*T_{kn}(I_k)) \text{ for } (x,y) \text{ in } O_n \quad (3)$$

For all regions or patches that did not contribute to Iout ($|J_n|=dn<=k$), the multiplication operation is not needed and only the $T_{kn}(I_k)$ is relevant. For example, this exploit saves on the ISP 420 computations because the pre-images of the discarded $T_{kn}(I_k)$ would not have to be acquired or tuned as there is no use for them. These aspects lead to large potential system performance benefits. The key to superior performance and thereby avoiding mis-aligned blending of images is finding a tile map $\{O_n\}$ that has advantageous properties for the remapping and synthesis/blending hardware (e.g. the environment) performing the task. In general, tiles with a smaller diversity index are beneficial, but too many small tiles may increase overhead due to frequent configuration switches in the hardware.

Figure 7B:
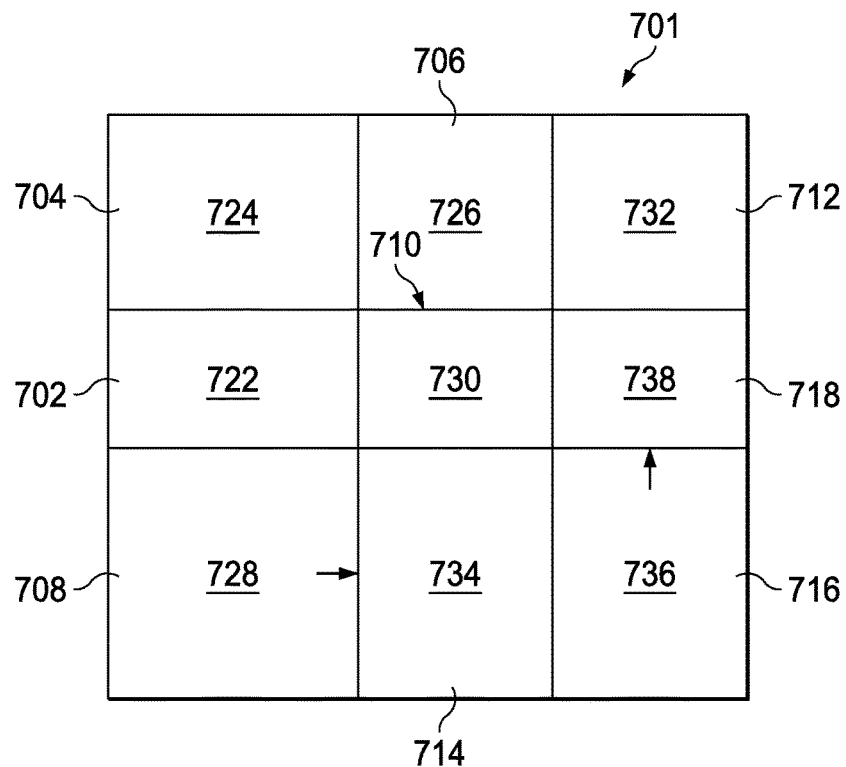
FIG. 7B illustrates a potential tile mapping table with tiling shown to have moved from the initial state seen in FIG. 7A.

FIG. 7B illustrates another example of a tile mapping table 701. The boundaries of the tile mapping table 701 are set in pixels. Each one of tiles 702-718 has a respective area of interest or region (722, 724, 726, 728, 730, 732, 734, 736, and 738) and each region includes: the diversity number (dn) or the number of cameras 401 to be blended and the IDs of the cameras 401 to be blended. The number (k) of cameras to be blended may be zero, for example, if only one camera (e.g. image capture device 4) is needed for a specific region 722-738.

The size of the dead zone region 730 located centrally may sequentially change in the x and y-direction, e.g. by a multiple of the size of the bus burst to increase DMA productivity. For example, a step may be a decrease in a dead zone region 730 in one direction (x or y) at a time or both as illustrated in FIG. 7B. FIG. 7B shows a decrease in both the x and y-directions. In one example, the number of times that the tiles changes in size and number determine how many potential candidate tile mapping tables are calculated. As the dead zone region 730 changes, the dn may be affected. The repetitive stepping method may find the tile map size and number that has the least cost in a cost function, as will be further explained below.

In some implementations, the method could utilize machine learning. For example, if changing in one direction (e.g. x) over the other (e.g. y) shows a benefit to performance factors, then the machine learning will continue in this direction until the performance factors no longer receive a benefit. In one example, the candidate tile mapping tables generate until a solution (e.g. a lowest cost) is found and is saved as the final tile mapping table. In other implementations, the initial tiling is not nine tiles as illustrated, but any number of tiles can begin the process (e.g. one or more).

Referring to FIG. 4, blending module 409 further involves tile mapping table calculations that use a cost function (FIGS. 7A-7B). In one example, the cost function determines the least cost for utilizing performance factors to produce a final output pixel in an output surround view image 425 for a particular environment. In addition, the cost function ultimately contributes to a final tile mapping table for a particular pre-defined viewpoint. The particular objective of the cost function and tiling mapping table depends on the particular problem, hardware characteristics, or other operational factors.

One example performance factor is the number of CPU cycles per frame or the number of clock cycles it takes for the CPU (e.g. a DSP) to render surround view image 425 (or frame of the output surround view image 425) at the display's frame rate (e.g. 60 Hz). Another performance factor is the bandwidth per frame or how much data can be transmitted through a connection (e.g. MB per frame). As the image file or image data 435 streams, image frames are continuously delivered from the cameras 431 to the display screen 413 that is displaying the image file or data. The display screen 413 plays each frame as it is received. If there are many changes between frames, then the size of each frame is larger, and more data transmits with each frame.

Another performance factor is a tile mapping table storage size (e.g. MB per view). Another performance factor is a direct memory access (DMA) overhead size. DMA is a feature of computer systems that allows certain hardware subsystems to access main system memory (random-access memory) independent of the central processing unit (CPU). By using DMA, the bottleneck of the read operation will no longer be the CPU since the CPU is no longer responsible for setting up the device, checking if the device is ready after the read operation, and processing the read operation itself. Rather, the bottleneck transfers to the PCI BUS of the particular environment or system.

Another performance factor may be a production of a total number of output pixels, e.g. LDC output size (pixels per frame). Fewer pixels reduces LDC utilization, overall bandwidth, and indirectly affects computations on the DSP. Other performance factors include a boot time (e.g. seconds), multiplication operations per frame, and add operations per frame.

Given a tile mapping table candidate (see FIG. 7B), a more superior table can be developed by modeling performance factors such as: bandwidth, cycles per frame, DMA overhead, table storage size, boot time, and other computational statistics and analytics during synthesis and ISP. Modeling means putting cost weights associated with each factor into a cost function, such as:

Cost=w1*bandwidth per frame+w2*cycles per frame (DSP)+w3*table storage size+w4*DMA overhead+w5*boot time where w1-w5 are weights given by a user for the specific operational environment. Weights w1-w5 may have a zero value to recognize that this performance factor does not affect the outcome for a specific environment.

In one example, smaller tiles add up to larger overhead (due to the increasing number of total tiles). In another example, tiles with a larger diversity index need more computations (due to 3- or 4-way synthesis), more bandwidth (to bring in more LDC outputs), and a larger blend table storage size. A goal is to keep the large diversity index tiles small and few. Those tiles with a diversity index of one do not even need to store pixel-wise weights since no blending of those pixels will occur, which saves on performance factors as mentioned above.

Figure 8:
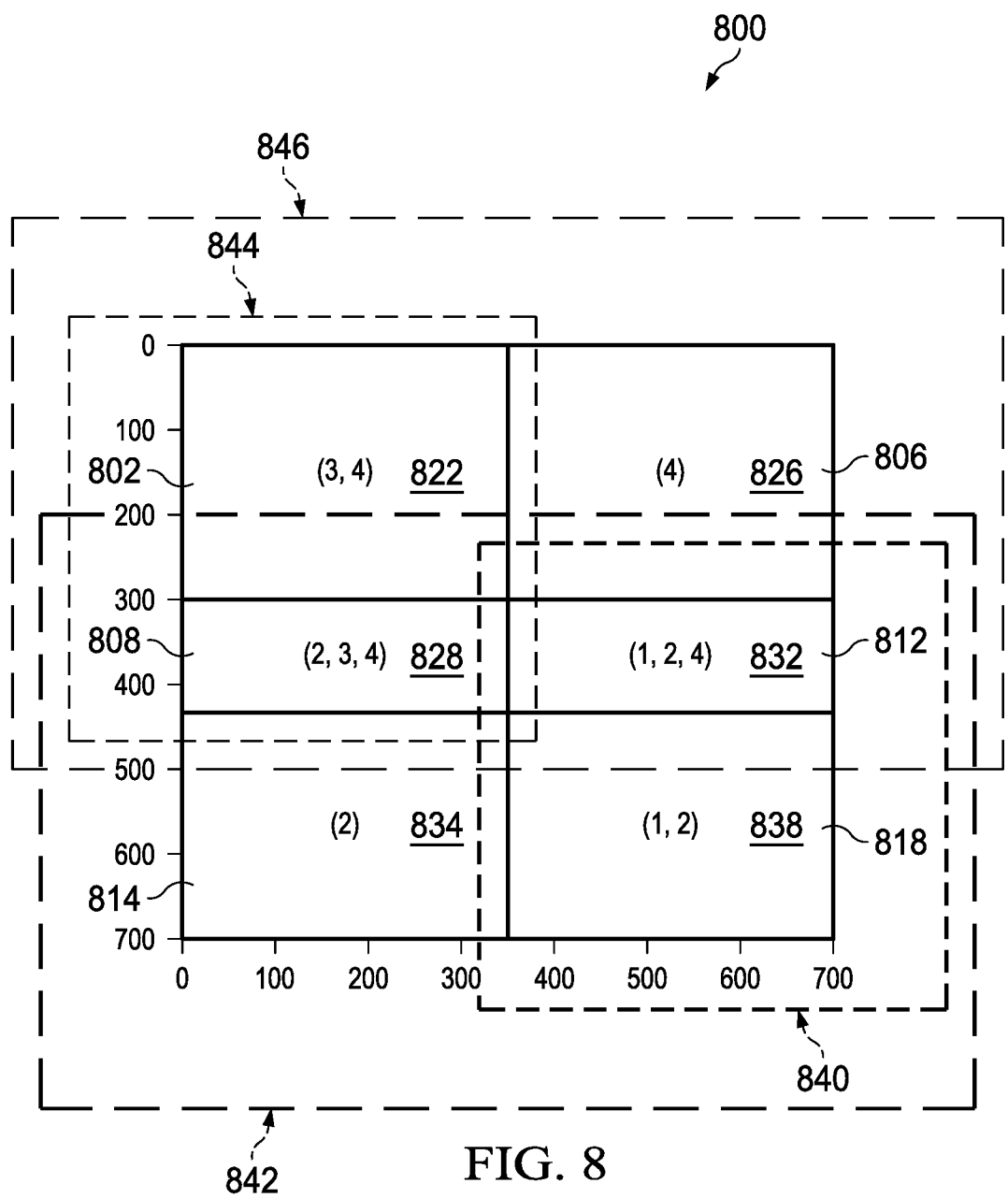
FIG. 8 illustrates a final tile mapping table with tiling in a final position from an initial state as seen in FIG. 7A.

FIG. 8 illustrates a superior or final tile mapping table 800. The boundaries of the final tile mapping table 800 are set in pixels. The final tile mapping table 800 has tiles 802, 806, 808, 812, 814, and 818, which correspond to tiles 702, 706, 708, 712, 714, and 718 of FIGS. 7A-7B. Each tile has a specific area of interest or region 822, 826, 828, 832, 834, 838, which correspond to regions 722, 726, 728, 732, 734, 738 of FIGS. 7A-7B. Ultimately, the method described above changes the number of tiles from nine to six. Each one of tiles 802, 806, 808, 812, 814, and 818 creates a boundary that captures particular locations of pixels within the area of the tile. The areas of interest or regions 722, 726, 728, 732, 734, 738 of the tiles 702, 706, 708, 712, 714, and 718 change as illustrated repeatedly to create a superior solution seen in FIG. 8 based on a cost function with the associated weights, such as:

Cost=0.33*bandwidth per frame+0.33*cycles per frame (DSP)+0*table storage size+0.33*DMA overhead+0*boot time Each region 822-838 has a diversity index. Region 822 has a diversity index of two (e.g. image capture devices 3, 4). Region 826 has a diversity index of one (e.g. image capture device 4). Region 828 has a diversity index of three (e.g. image capture devices 2, 3, 4). Region 832 has a diversity index of three (e.g. 1, 2, 4). Region 834 has a diversity index of one (e.g. image capture device 2). Region 838 has a diversity index of two (e.g. image capture devices 1, 2). Smaller regions 828 and 832 have the highest diversity index of three as was explained above. In one implementation, HWA 424 handles only one camera stream at a time, in which case the tile mapping table also includes boundary boxes 840, 842, 844, 846. Boundary box 840 represents camera one (e.g. front). Likewise, boundary box 842 represents camera two (e.g. left side); boundary box 844 represents camera three (e.g. right side); and boundary box 846 represents camera four (e.g. back). The data stream of each of the cameras 431 being bounded to a specific area and those areas determine where the image data 435 needs to be blended (e.g. diversity index greater than 1). This increases the productivity of the ISP 420, DSP 422, and HWA 424, and diminishes mis-alignments of seamlines when synthesizing an output virtual pixel on the output domain of the display screen 413. In one example, a memory may save the final tile mapping table 800 and may also replace the conceptual blending tables in memory.

With reference back to FIG. 4, the rendering stage 406 takes real time image data from cameras 431 after they have been processed as described above by the capture and edit module 403. The cameras 431 may or may not be the same cameras 401 as used in the configuration stage 402. The stream of image data 435 is calibrated and geometrically transformed or warped by utilizing the calibrated viewpoint lookup tables before flowing to a DSP 428. The DSP 428 in the context of runtime of the rendering stage 406 includes a synthesizer 411 to employ the tile mapping table 430 to generate a surround view image 425 and transmit the surround view image 425 to a display screen 413. The DSP 428 may be the same DSP 422 or a different DSP as the one used in the context of configuration stage 402. The surround view image 425 repeatedly alters in real-time utilizing these image data 435 (e.g. data stream) from the set of cameras 431. The DSP 428 cycles through a series of different virtual camera viewpoints and creates a 2-D output for each mapping at video frame rates (e.g. 30 Hz, 60 Hz) to achieve a surround view image 425.

Figure 9:
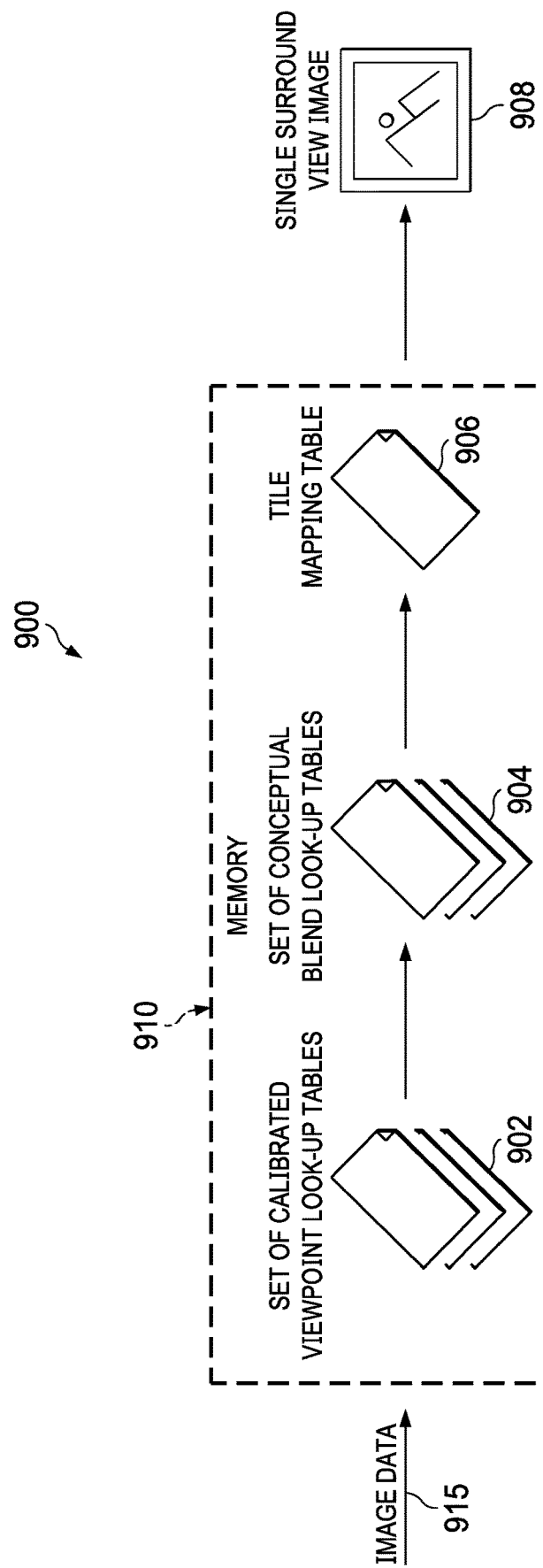
FIG. 9 illustrates a pictorial flow diagram illustrating the digital signal processing synthesizer process of producing a 3-D surround view image according to an implementation.

FIG. 9 illustrates an operational scenario 900 described with respect to surround view architecture 400 for producing a surround view image. In operation, each surround view image 908 may be a stitched and/or blended image that combines image data 915 coming from a number of cameras, a set of calibrated viewpoint look-up tables (or mesh tables), and a set of conceptual blending look-up tables to produce a partitioned blend table or tile mapping look-up table. The synthesizer 411 of FIG. 4 may call from memory 910: a calibrated viewpoint look-up table 902 created by the calibration module 405, a conceptual blending look-up table 904 created by the blending module 409, and a tile mapping look-up table 906. The calibrated viewpoint look-up table 902 and the conceptual blending look-up table 904 may be associated with a single camera and saved as a set with respect to a virtual viewpoint. The synthesizer 411 (within DSP 422) reviews the tile mapping look-up table 906 and determines a location for every single pixel of image data 435 in the surround view image 908. The synthesizer 411 only utilizes those specific data frames of the image data 435 within the boundary or ROI from that specific camera where directed to by the tile mapping look-up table 906 to save on performance factors and avoid mis-alignment of blending seamlines. The synthesizer 411 will repeat this procedure for all associated cameras. The tile mapping look-up table 906 also tells the synthesizer 411 where to blend camera images. The conceptual blending table has the weights given to the camera images and tells the synthesizer 411 how much each frame in the image data 915 may be associated with the surround view image 908. In some implementations, the tile mapping look-up table 906 may have the same information as the conceptual blending look-up table 904, and therefore may replace the conceptual blending look-up table 904.

FIG. 10 illustrates an example block diagram of an example of a 3-D surround view system 1000, included in a vehicle with four cameras or image capture devices. In one implementation the four cameras include: a first single vision camera module 1011 (e.g. front), a second single vision camera module 1012 (e.g. left), a third single vision camera module 1013 (e.g. right), and a fourth single vision camera module 1014 (e.g. back). Each camera module 1011-1014 includes respective lenses 1015-1018 (e.g. wide angle), respective mini-serializer boards 1021-1024, each board having respective camera sensors 1025-1028 (e.g. On Semiconductor AR0140AT, AR0542, AR0543), and serializers 1031-1034 (e.g. Texas Instruments DS90UB913, DS90UB901, DS90B903). Serializers 1031-1034 are used to serialize data and clock signals into a single stream. For example, one cycle of a clock signal is transmitted first, followed by the data bit stream, which creates a periodic rising edge at the start of the data bit stream. A de-serializer (e.g. 1020) separates the clock signal from the data stream, such that only the data bit stream transmits.

Communication interfaces, especially for camera-based systems like surround view and back-up cameras, benefit from the FPD-Link III SerDes family, such as vision application board 1020 that includes a multi-Deserializer (SerDes) Board 1040 having deserializers 1041 (e.g. TI DS90UB960, DS90UB936, DS90UB954), which help to reduce the effort to connect remote satellites to central processing modules using a single coaxial low-voltage differential signaling cable 1030. Reduced wiring effort and smaller modules due to smaller connectors and highly integrated components ensure that the number of sensor modules is not over burdening, for example, in new cars with a high extra cost and weight.

In an example implementation, the surround view system 1000 is a SoC 1050 such as those available from Texas Instruments Incorporated (TI) including the TDA3x and TDA2Px family of devices that may be augmented to include examples of the techniques disclosed herein. The TDAxx solution includes a fully integrated set of peripherals to simplify design and reduce storage space, thus facilitating sensor fusion as illustrated in FIG. 10. For example, a wireless HDMI transmitter 1051 in a remote implementation establishes a wireless link between the display system 1005 and the SoC 1050 as illustrated in FIG. 10. A screen or display system 1005, for example, is installed within the vehicle or remotely. The display system 1005 further includes a wireless receiver (HDMI) 1052 to receive a wireless transmission from the SoC 1050.

FIG. 11 illustrates an image processing system 1100 suitable for implementing the various environments, systems, architectures, processes, scenarios, and sequences discussed above with respect to the image processing circuitry 132 from FIG. 1. Examples of the image processing system 1100 may include: systems on a chip, computers, server computers, web servers, cloud computing platforms, as well as any other physical or virtual server machine, container, and any variation or a combination thereof.

The image processing system 1100 may be implemented as a single apparatus, a system, or a device or may be implemented in a distributed manner as multiple apparatuses, systems, or devices. In one implementation, the image processing system 1100 includes the processing circuitry 1140, the storage system 1110, the software 1120, the communication interface system 1130, and the user interface system 1150 (optional). The processing circuitry 1140 connects with the storage system 1110, the communication interface system 1130, and the user interface system 1150.

The processing circuitry 1140 loads and executes the software 1120 from the storage system 1110. The software 1120 includes and implements the image process 1125, which represents at least some of the processes discussed with respect to the preceding Figures. When executed by the processing circuitry 1140 to implement the method described above with respect to FIG. 2B, the software 1120 directs the processing circuitry 1140 to operate as described herein for at least the various processes, operational scenarios, and sequences discussed in the foregoing implementations. The image processing system 1100 may optionally include additional devices, features, or functionality not discussed for purposes of brevity.

Referring still to FIG. 11, the processing circuitry 1140 includes: a microprocessor, a system on a chip, image processing, digital signal processing, hardware accelerators, and/or other circuitry that retrieves and executes the software 1120 from the storage system 1110. The processing circuitry 1140 may be implemented within a single processing device but may also be distributed across multiple processing devices or sub-systems that cooperate in executing program instructions. Examples of the processing circuitry 1140 include general purpose central processing units, graphical processing units, application specific processors, and logic devices, as well as any other type of processing device, combinations, or variations thereof.

The storage system 1110 includes any computer-readable storage media readable by the processing circuitry 1140 and capable of storing the software 1120. The storage system 1110 includes non-transitory, volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In some implementations the storage system 1110, also includes computer-readable communication media over which at least some of the software 1120 may communicate internally or externally. In some implementations the storage system 1110 is a single storage device but in other implementations is implemented across multiple storage devices or sub-systems co-located or distributed relative to each other. In other implementations the storage system 1110 includes additional elements, such as a controller, capable of communicating with the processing circuitry 1140 or possibly other systems.

In some implementations the software 1120 (including image process 1125) is implemented in program instructions and among other functions, when executed by the processing circuitry 1140, directs the processing circuitry 1140 to operate as described with respect to the various operational scenarios, sequences, and processes illustrated herein. In some implementations, the software 1120 includes program instructions for implementing a process to create and partition a blend table as described herein.

In particular, the program instructions include various components and/or processes that cooperate or otherwise interact to carry out the various processes and operational scenarios described herein. The various components and/or processes are embodied in compiled or interpreted instructions, or in some other variation or combination of instructions. The various components or modules execute in a synchronous or asynchronous manner, serially or in parallel, in a single-threaded or multi-threaded environment, or in accordance with any other suitable execution paradigm, variation, or a combination thereof. In some implementations, the software 1120 includes additional processes, programs, or components, such as an operating system software, virtualization software, or other application software. In other implementations, the software 1120 includes firmware or some other form of machine-readable processing instructions executable by the processing system 1102.

In some implementations the communication interface system 1130 includes communication connections and devices that allow for communication with other computing systems (such as the image processing circuitry 142 from FIG. 1A) and devices (such as the image capture devices 131 from FIG. 1A) over communication networks (not shown). Examples of connections and devices that together allow for inter-system communication include network interface cards, antennas, power amplifiers, RF circuitry, transceivers, and other communication circuitry. The connections and devices communicate over communication media to exchange communications with other computing systems, displays, or networks of systems, such as metal, glass, air, or any other suitable communication media.

Communication between the image processing system 1100 and other computing systems (not shown), occur over a communication network or networks and in accordance with various communication protocols, combinations of protocols, or variations thereof. Examples include intranets, internets, the Internet, local area networks, wide area networks, wireless networks, wired networks, virtual networks, software-defined networks, data center buses and backplanes, or any other type of network, a combination of network, or variation thereof.

It may be appreciated from the foregoing description of FIGS. 1-11 that an image synthesizer or a synthesis function receives input video streams from a multitude of cameras and creates a composite view of the multitude of cameras. A surround view image system converts 2-D input video streams into a surround view image that a 2-D monitor or display may display. One such application for the surround view image system has been introduced into automobiles to reduce human operation error referred to as an advanced driver assistance system (ADAS). The system may assist a driver in parking the vehicle safely by allowing the driver to see a top-down view of the 360-degree surroundings of the vehicle the system. Such systems may provide functionality such as rear-view facing cameras, electronic stability control, and vision-based pedestrian detection systems. Another application may be replacement rear-view and side-view mirrors with a rear-view panorama and a side view panorama display in an automobile or vehicle.

Another application is with respect to an autonomous vehicle which uses sensor data from lidar systems, camera systems, and radar systems to predict the motion of objects and determine the motion of travel. Many other such systems, for example, industrial applications, high-performance computing, robotics, drones, etc. rely on computer vision processing to detect objects in the field of view of one or more cameras.

A surround view image system as contemplated herein achieves a virtual camera defining a pre-defined viewpoint for the displayed view. One of many emerging applications of synthesis is a 3-D surround view from wide-angle lens cameras mounted on vehicles. A vehicular 3-D surround view is one such application with a 3-D world represented on a smooth surface. In such an environment, the virtual viewpoint (virtual camera angle) may change to better suit the driver and the surroundings. A set of viewpoints are pre-defined, and image data streams sequentially (e.g. at 30 frames per second) producing a video image in real time of the surrounding area of the vehicle at the pre-defined virtual viewpoint.

The selection of the virtual viewpoints responds to cues from the driver. For example, shifting a transmission from forward to reverse changes the viewpoint to look towards the rear of the vehicle. Turning the wheels causes the viewpoint to swing in the direction of travel, for example. The viewpoint swings closer to the vehicle at low speeds and swing farther from the vehicle at higher speeds, for example. In this manner, a real-time video image displaying the area surrounding the vehicle provides the driver of a vehicle aid in driving the vehicle.

The technique is applied to any application that uses a smooth surface rendering from multiple viewpoints, such as medical imaging, rearview or side mirror replacement, security systems with multiple cameras, industrial applications, etc.

While the disclosure has been described with reference to illustrative examples, this description is not intended to be construed in a limiting sense. For example, while a vehicle with four cameras is illustrated herein, other examples may include more or fewer cameras. While video frame rates of 30 fps have been discussed above other examples may use faster or slower frame rates. Faster frame rates may require more extensive processing capabilities.

While a vehicle with an onboard driver has been described herein, other examples may be implemented in a vehicle in which the "driver" is remote from the vehicle, such as autonomous vehicles that may be controlled from a remote site.

As used herein, the term "vehicle" may also apply to other types of devices, such as trucks, trains, boats, planes, drones, robots, industrial devices, medical devices, etc. in which low cost, low power processing of images from multiple cameras to form a virtual viewpoint in real time is beneficial.

Certain terms are used throughout the description and the claims to refer to particular system components. Components in digital systems may be referred to by different names and/or may be combined in ways not shown herein without departing from the described functionality. This document does not intend to distinguish between components that differ in name but not function. Also, the term "couple" and derivatives thereof are intended to mean an indirect, direct, optical, and/or wireless electrical connection. Thus, if a first device couples to a second device, that connection is through a direct electrical connection, through an indirect electrical connection via other devices and connections, through an optical or optical-electrical connection, and/or through a wireless electrical connection.

Aspects of the present disclosure may be embodied as a system, method or computer program product. Accordingly, aspects of the present disclosure may take the form of an entirely hardware example, an entirely software example (including firmware, resident software, micro-code, etc.) or an example combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Although method steps may be presented and described herein sequentially, one or more of the steps shown and described may be omitted, repeated, performed concurrently, and/or performed in a different order than the order shown in the figures and/or described herein. Accordingly, examples of the disclosure should not be considered limited to the specific ordering of steps shown in the figures and/or described herein.

For the purpose of teaching inventive principles, some aspects have been simplified or omitted. As a result, the disclosure is not limited to the specific examples described above, but only by the claims and their equivalents.

What is claimed is:

1. An apparatus comprising:
a memory that stores a blend table having blend weights for constructing a virtual image of a scene from pixels in images of the scene captured by a plurality of image capture devices, wherein the blend table includes a plurality of cells, each cell includes a blend weight for each of the plurality of image capture devices; and
one or more processing circuits coupled with the memory, wherein the one or more processing circuits are configured to, for a plurality of partitions composing the blend table:
determine, within a three-dimensional surface representation of the scene, a position of one or more seam lines within the scene;
in response to determining one or more seamlines, based on at least one of the blend weights in the partition, determine if a subset of the pixels associated with a given partition among the plurality of partitions includes one or more pixels associated with one or more seam lines;

in response to determining that none of the subset of the pixels are associated with the one or more seam lines, populate a region of the virtual image corresponding to the given partition with pixel values from an image captured by a single image capture device of the plurality of image capture devices; and in response to determining that one or more of the subset of the pixels is associated with the one or more seamlines, populate the region of the virtual image associated with the given partition with at least one blended pixel value comprising a blend of two or more pixel values from two or more images captured by two or more of the plurality of image capture devices.

2. The apparatus of claim 1, wherein each partition is rectangularly shaped, and wherein the one or more seam lines are defined in the three-dimensional surface representation of the scene.

3. The apparatus of claim 1, wherein the virtual image is based upon a location, orientation, and field of view of a virtual image capture device.

4. The apparatus of claim 1, wherein the memory also stores a remapping transform definition, and wherein the one or more processing circuits are also configured to remap pixel values from one or more images captured by the plurality of image capture devices for population of the virtual image based at least in part on the remapping transform definition.

5. The apparatus of claim 1, wherein each of the one or more seam lines is associated viewing angles of two of the plurality of image capture devices.

6. The apparatus of claim 1, further comprising at least one port coupled with the memory configured to receive images of the scene captured by the plurality of image capture devices.

7. A method comprising:
storing, in a memory, a blend table having blend weights based on one or more found edges for constructing a virtual image of a scene from pixels in images of the scene captured by a plurality of image capture devices; and in one or more processing circuits, for one or more partitions of the blend table:
determining, based on at least one of the blend weights in the partition, whether a subset of the pixels associated with the partition includes one or more pixels associated with one or more seam lines defined in a three-dimensional surface representation of the scene;

in response to determining that none of the subset of the pixels are associated with the one or more seam lines, populating a region of the virtual image corresponding to the partition with pixel values from an image captured by one of the plurality of image capture devices; and in response to determining that one or more of the subset of the pixels is associated with the one or more seamlines, populating the region of the virtual image corresponding to the partition with at least one blended pixel value comprising a blend of two or more pixel values from two or more images captured by two or more of the plurality of image capture devices.

8. The method of claim 7, wherein: each partition is rectangularly shaped; and the one or more seamlines are defined in a three-dimensional surface representation of the scene.

9. The method of claim 7, wherein the virtual image is based upon a location, orientation, and field of view of a virtual image capture device.

10. The method of claim 7, wherein the memory also stores a remapping transform definition, and wherein the method further comprises: remapping pixel values from one or more images captured by the plurality of image capture devices for population of the virtual image based at least in part on the remapping transform definition.

11. The method of claim 7, wherein the blend table includes a plurality of cells, each cell includes a blend weight for each of the plurality of image capture devices.

12. The method of claim 7, wherein each of the one or more seam lines is associated viewing angles of two of the plurality of image capture devices.

13. The method of claim 7, a size of the virtual image is different than a size of the images captured by the plurality of image capture devices.

14. A view system comprising:
a vehicle;
a plurality of image capture devices mounted on the vehicle;
a display screen mounted on the vehicle for viewing by an occupant of the vehicle; and
an image processing system coupled to the plurality of image capture devices and the display screen, configured to:
receive a plurality of image frames from a corresponding plurality of image capture devices;
read, from a memory, a blend table having blend weights for constructing a virtual image of a scene from pixels in images of the scene captured by a plurality of image capture devices;
for one or more partitions of the blend table:
determining, based on at least one of the blend weights in the partition, whether a subset of the pixels associated with the partition includes one or more pixels associated with one or more seamlines defined in a three-dimensional surface representation of the scene;
in response to determining that none of the subset of the pixels are associated with the one or more seamlines, populating a region of the virtual image corresponding to the partition with pixel values from an image captured by one of the plurality of image capture devices; and
in response to determining that one or more of the subset of the pixels is associated with the one or more seamlines, populating the region of the virtual image corresponding to the partition with at least one blended pixel value comprising a blend of two or more pixel values from two or more images captured by two or more of the plurality of image capture devices;
synthesize an output image for the display screen in accordance with the three-dimensional surface representation of the scene and the blend weights; and
provide the output image to the display screen.

* * * * *